United States Patent [19]
Kirby

[11] 3,883,826
[45] May 13, 1975

[54] ADJUSTABLE FREQUENCY OSCILLATOR WITH REGENERATIVE FEEDBACK AND A COUPLING UNIT INCLUDING A DIFFERENTIAL AMPLIFIER FOR ADJUSTING THE FEEDBACK

[75] Inventor: Ian John Kirby, Reading, England

[73] Assignee: Imperial Chemical Industries Limited, London, England

[22] Filed: Nov. 13, 1973

[21] Appl. No.: 415,320

Related U.S. Application Data

[63] Continuation of Ser. No. 269,023, July 5, 1972, abandoned.

[30] Foreign Application Priority Data

July 15, 1971 United Kingdom .............. 33236/71

[52] U.S. Cl. .................. 331/143; 331/65; 331/140; 331/181

[51] Int. Cl. .......................................... H03k 3/295

[58] Field of Search ............ 331/65, 111, 109, 143, 331/140, 141, 181

[56] References Cited

UNITED STATES PATENTS

| | | | |
|---|---|---|---|
| 2,782,311 | 2/1957 | Colander et al. | 331/141 |
| 3,254,311 | 5/1966 | Collins et al. | 331/181 |
| 3,302,129 | 1/1967 | De Chaumont | 331/109 |
| 3,315,179 | 4/1967 | Whitbread | 331/109 |
| 3,568,086 | 3/1971 | Perry | 331/65 |
| 3,573,664 | 4/1971 | Jacob | 331/143 |
| 3,581,238 | 5/1971 | Shimemura | 331/135 |
| 3,656,066 | 4/1972 | Reynal | 331/65 |

*Primary Examiner*—John Kominski
*Attorney, Agent, or Firm*—Cushman, Darby & Cushman

[57] ABSTRACT

This invention relates to an adjustable frequency oscillator comprising an integrator of the negative feedback operational amplifier type whose output is connected to a bistable-bipolar threshold device, a regenerative feedback connection between the output of the threshold device and an input of the integrator and an adjustable coupling unit for adjusting the amount of regenerative feedback.

7 Claims, 15 Drawing Figures

ADJUSTABLE FREQUENCY OSCILLATOR WITH REGENERATIVE FEEDBACK AND A COUPLING UNIT INCLUDING A DIFFERENTIAL AMPLIFIER FOR ADJUSTING THE FEEDBACK

This application is a continuation of my copending application Ser. No. 269,023, filed July 5, 1972 which was abandoned upon the filing of this application.

The invention relates to an adjustable frequency oscillator.

The output frequency of known adjustable frequency oscillators does not vary linearly in response to changes in the values of circuit parameters. For example, the output frequency of simple relaxation oscillators having fixed capacitance bears a reciprocal relationship with the resistance. In the case of a Wien Bridge oscillator and a tuned inductance-capacitance oscillator there is a reciprocal square root functional relathionship between the output frequency and the value of the circuit parameters which are resistance and capacitance, and inductance and capacitance respectively.

According to this invention an adjustable frequency oscillator comprises an integrator whose output is connected to a bistable-bipolar threshold device, a regenerative feedback connection between the output of the threshold device and an input of the integrator and an adjustable coupling unit for adjusting the amount of regenerative feedback.

Preferably, the integrator is of the negative feedback operational amplifier type. Further, the threshold device may be a voltage comparator with a bistable, bipolar output (one stable output state being a predetermined positive voltage and the other being a predetermined negative voltage) and having means for switching the bipolar outfit from one state to the other state each time the input voltage applied thereto exceeds a predetermined fraction of the bipolar output and has a polarity opposite to the bipolar output.

The oscillator operates by means of a feedback technique in which an adjustable fraction of the output voltage of the threshold device is applied to the output of an integrator. When the output of the integrator reaches a predetermined positive level, the output voltage of the oscillator is switched to the opposite polarity. As a result, the integration reverses direction until it reaches the predetermined negative level, whereupon the output voltage of the oscillator is switched to its original polarity. The integration rate and therefore the frequency of switching is proportional to the fraction of the output applied to the input of the integrator.

Embodiments of the invention will now be described by way of example with reference to the accompanying drawings of which:

Figure 1A:
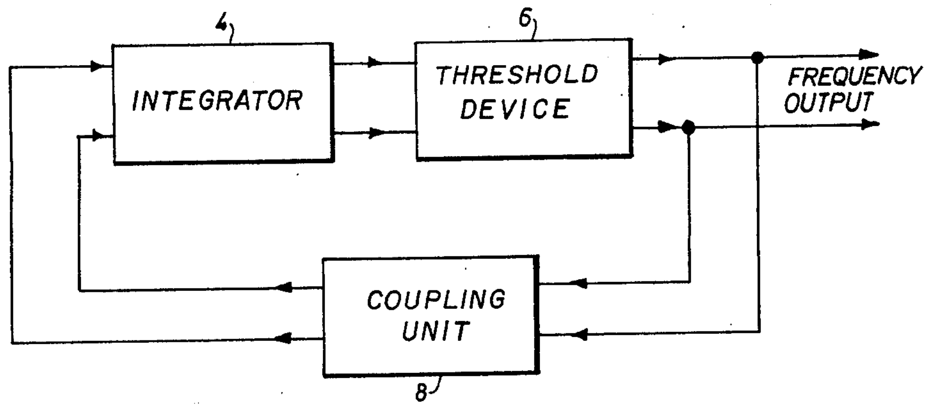
FIG. 1A is a block diagram of an adjustable frequency oscillator according to this invention.
Figure 1B:
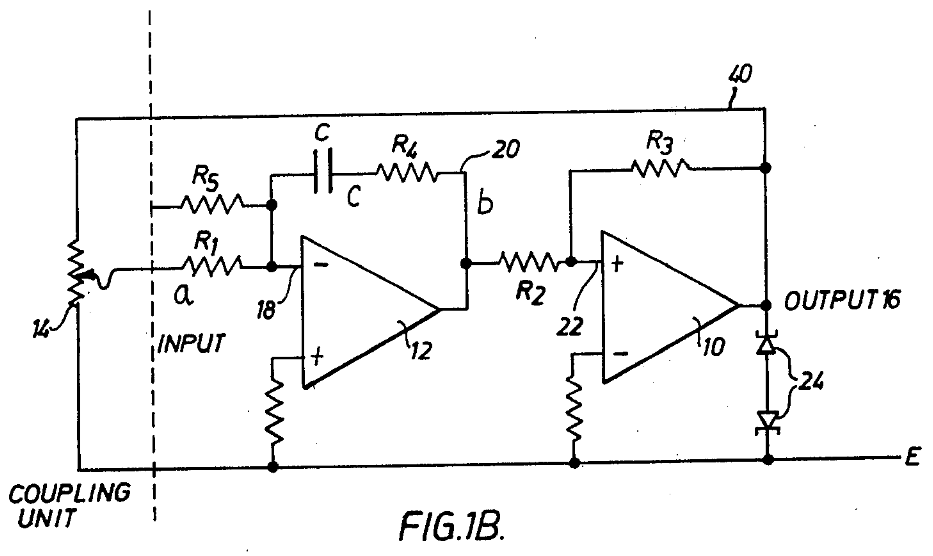
FIG. 1B is a circuit diagram of one embodiment of an adjustable frequency oscillator.
Figure 2A:
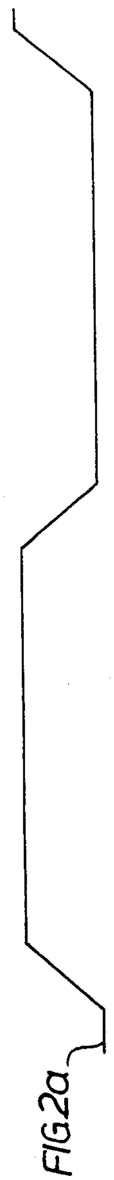
Figure 3A:
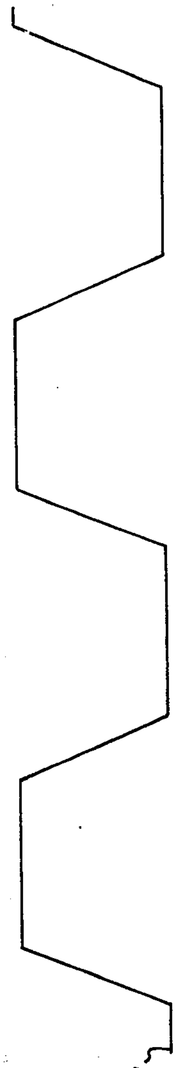
Figures 3B, 3C:
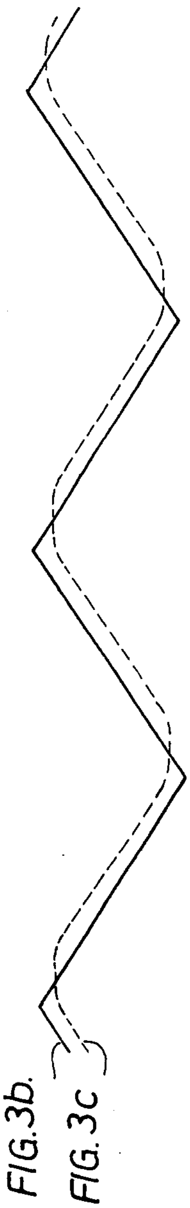
Figure 4:
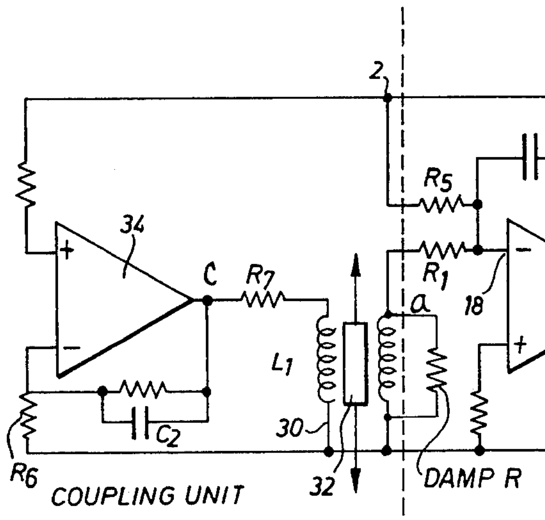
Figure 6:
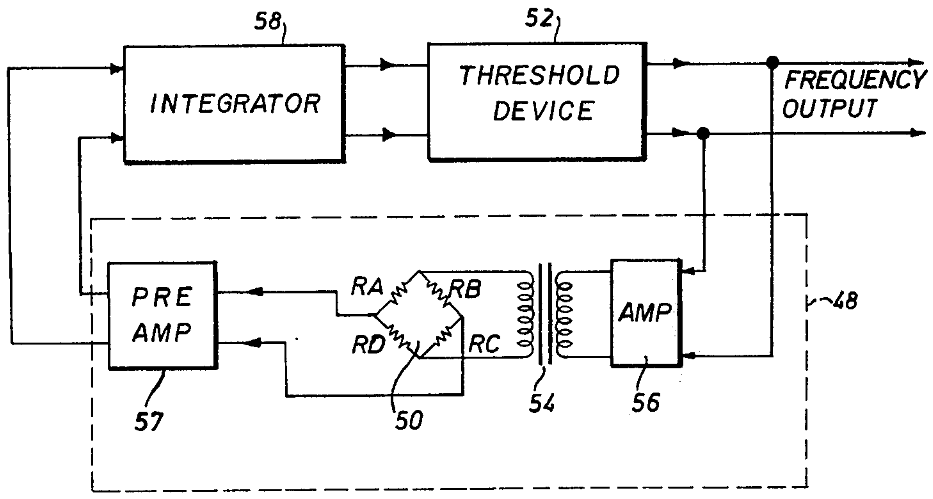
Figure 5A:
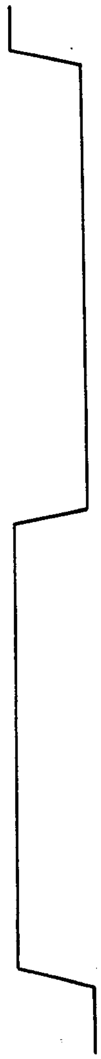
Figure 5B:
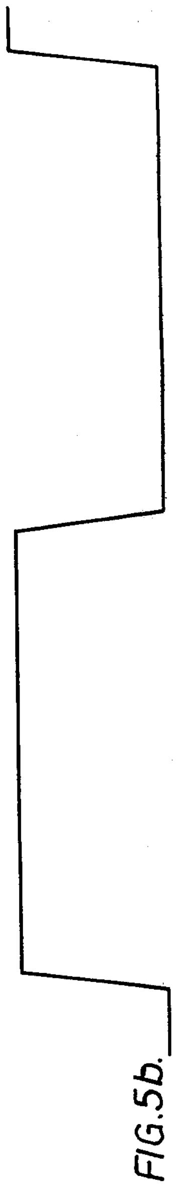
Figure 5C:
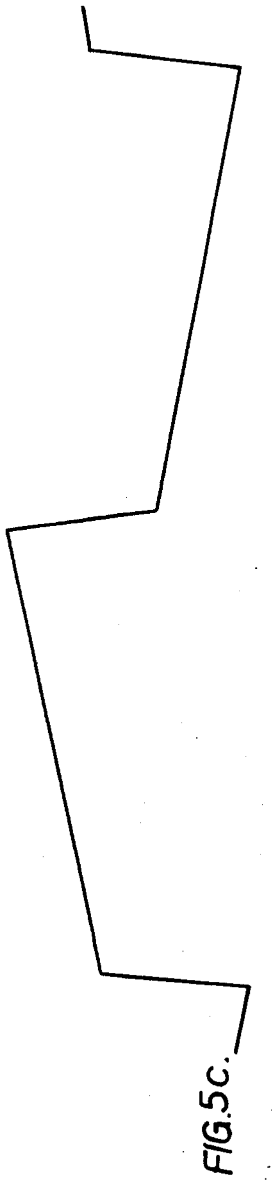
Figure 7:
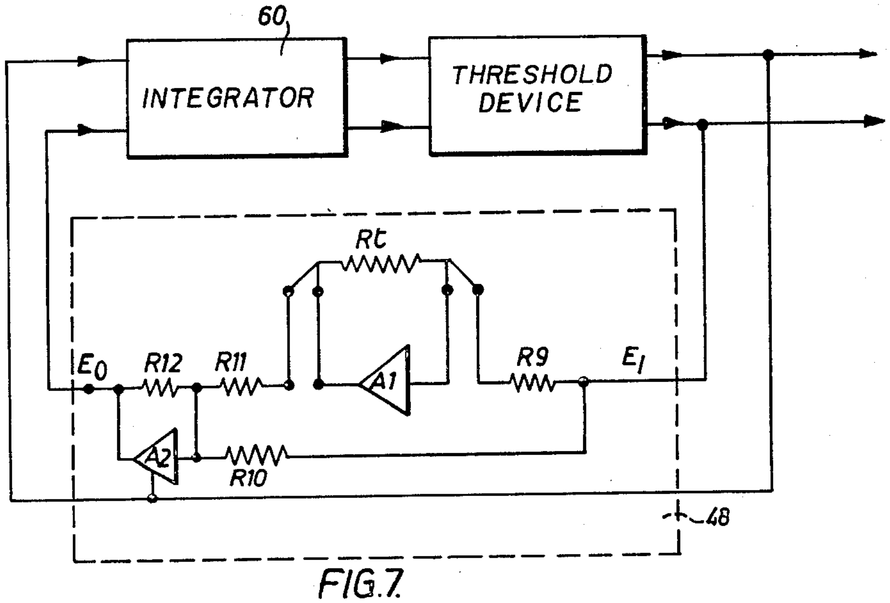
Figure 8:
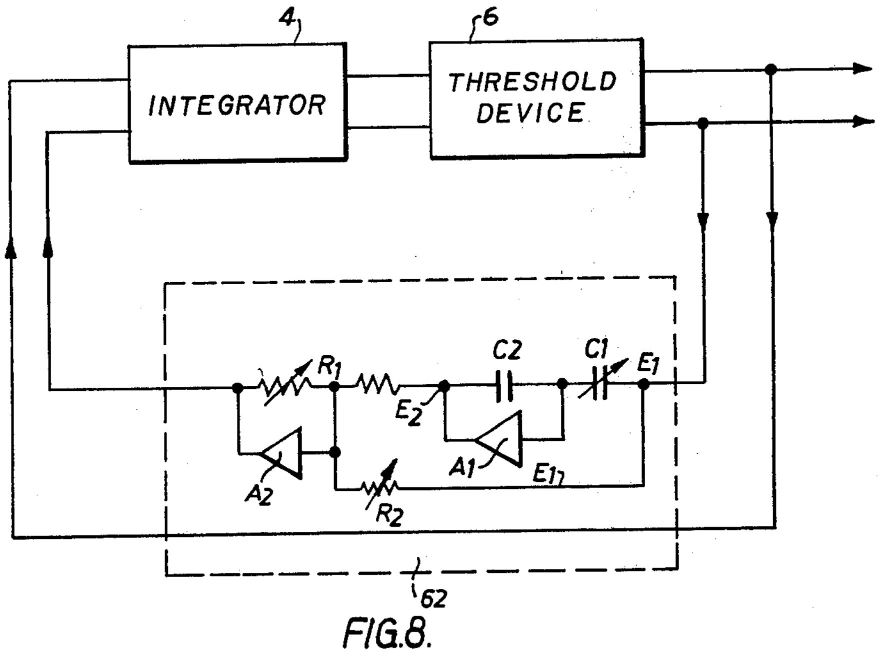

FIGS. 2*a*, *b*, *c* and FIGS. 3*a*, *b* and *c* show waveforms at points *a*, *b* and *c* of FIG. 1B for two different feedback settings;

FIG. 4 is a circuit diagram of another embodiment of adjustable frequency oscillator;

FIG. 5*a*, *b* and *c* show waveforms at points *a*, *b* and *c* of FIG. 4;

FIG. 6 shows yet another embodiment of an adjustable frequency oscillator wherein the coupling unit comprises a resistance bridge circuit;

FIG. 7 shows a further embodiment of an adjustable freuqency oscillator wherein the frequency is adjustable in response to a resistance thermometer, and FIG. 8 shows yet a further embodiment of an adjustable frequency oscillator wherein the coupling unit is controlled by a variable capacitance.

The adjustable frequency oscillator shown in FIG. 1A is formed from an integrator 4, a bistable bipolar threshold device 6 and an adjustable voltage coupling unit 8 connected in a regenerative feedback loop between the output of the device 6 and the input of the integrator 4.

The adjustable frequency oscillator shown in FIG. 1B is formed from discrete electronic components and operational amplifiers 10 and 12 and a potentiometer 14 (such as a slide wire potentiometer) is connected via an input resistor $R_1$ in a feedback loop 40 from the output 16 of operational amplifier 10 to the input 18 of the operational amplifier 12. Operational amplifier 12 is connected as an integrator having a resistor $R_4$ and a capacitor $C_1$ in a negative feedback loop 20. Operational amplifier 10 is connected as a Schmitt Trigger circuit with a resistor $R_3$ in the negative feedback loop and the integrator 12 is connected to its input 22 via a resistance $R_2$. This amplifier 10 changes state when the voltage at the junction of resistors $R_2$ and $R_3$ passes through zero. The voltage at output 16 may take positive ($+V_z$) or negative ($-V_z$) values, where $V_z$ is the breakdown voltage of the zener diodes 24 across the output 16. A fraction of this voltage, determined by the setting of the potentiometer 14 is applied to the input resistor $R_1$. Typical waveforms at points *a*, *b* and *c* for two settings of the potentiometers are shown in FIGS. 2*a*, *b* and *c* and FIGS. 3*a*, *b* and *c*. The times taken to switch from one polarity to the other have been exaggerated so that the effect of this delay can be more easily seen. The two sets of waveforms show that by doubling the input voltage (point *a*) the rate of change output voltage of the integrator (point *b*) is doubled, and also therefore the switching frequency.

Figures 2B, 2C:
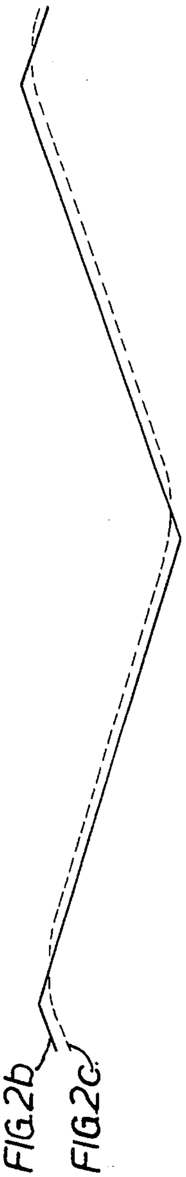

In practice the output waveform is not a square wave, but takes a finite time $t$ to change from one state to the other, thus resulting in a non-linear frequency response. This non-linearity is compensated by inserting a resistor $R_4$ in series with the integrating capacitor $C_1$, so that the voltage at the output of the integrator is advanced by a time $t/2$ relative to the voltage that would be obtained with non-compensated integration. The effect of this advance is shown in FIGS. 1 and 2 curves *b* (compensated) and *c* (non-compensated) and although the compensation is not exact, the non-linearity can be reduced by a factor 30.

In principle, this circuit may be used with any device which has a variable voltage coupling between input and output. However, a necessary condition for obtaining a linear frequency response from the circuit is that the device used in the feedback path has a transfer function which is frequency independent. It may, however, be used with frequency dependent devices by employing additional compensative circuits.

In another embodiment of the invention (FIG. 4) the coupling device or means by which the amount of feedback is adjustable is a differential transformer 30.

The transformer 30 has both a low frequency attenuation due to the finite resistance of the primary winding and high frequency attenuation, due to the self capacitance of the secondary winding of the transformer. The low frequency attenuation is compensated by producing, in an operational amplifier 34, a trapezoidal waveform drive to the primary winding. This ensures that the output voltage waveform of the secondary winding remains a square wave down to low frequencies. The shape of the trapezoid is determined by the time constant of the feedback path including $R_6$ and $C_2$, This time constant is equal to the product of $R_6$ and $C_2$ and is set so as to be equal to the time constant ($L_1/R_7$) of the primary winding of the transformer 30. At high frequencies and with a damping resistor (not shown) connected across the secondary winding, the effect of the transformer 30 approximates to a simple delay. This can be compensated, as before, by advancing the output voltage of the integrator 12 by a time equal to the delay.

Differential transformers give, in general, both positive and negative outputs and when incorporated in the circuit of FIG. 4, will result in either a positive or a negative feedback. In order to maintain the loop in a positive or regenerative condition it is therefore necessary to elevate the frequency of the oscillator. This is achieved by adding a fixed feedback path to the summing junctions of the integrator and including a resistor $R_5$ therein.

With no signal from the differential transformer 30 the circuit will oscillate at a frequency proportional to $(R_5 \times C_1)^{-1}$. Signals from the transformer 30 will modify this frequency in both the positive and negative direction.

The feature of inserting $R_5$ to elevate the frequency of oscillation may be extended to produce an adjustable frequency oscillator in which the output frequency is not only continuously variable but also variable in discrete steps. This is achieved by including a switch (not shown) for adding one or more fixed resistors into the feedback path for setting the value of resistor $R_5$.

An adjustable frequency oscillator having a differential transformer may be used to provide an output frequency which bears a substantially linear relationship to a quantity to be measured since the position of a core 32 in the transformer 30 (FIG. 4) determines the output frequency of the oscillator. Thus by linearly displacing the core 32 in response to changes in the quantity to be measured, a linear relationship is established between the output frequency and that quantity. An oscillator including such a transformer has an application, for example, as a load cell or pressure gauge.

Other forms of coupling units may be used when it is desired to produce a signal having a frequency linearly related to a quantity to be measured. FIG. 6 shows an adjustable frequency oscillator having a coupling unit 48 comprising a resistance bridge 50 to which the output of the bistable bipolar threshold device 52 is coupled by a transformer 54 and linear power amplifier 56. The output of the bridge 50 is connected to a preamplifier 57 feeding the input of the integrator 58. The bridge 50 is constituted by four resistive limbs $R_A$, $R_B$, $R_C$ and $R_D$ and when the bridge is balanced ($R_A.R_C = R_D.R_B$) there will be no regenerative feedback but, as the balance is disturbed by varying the resistance of one arm of the bridge, the amount of regenerative feedback will be increased.

In the embodiment shown in FIG. 7 the amount of regeneration feedback is adjustable by varying the resistance ($R_t$) in the negative feedback loop of an operational amplifier $A_1$, which is connected in series with resistors $R_{11}$ and $R_9$. Resistors $R_{11}$ and $R_9$ and amplifier $A_1$ are connected in parallel with resistor $R_{10}$ to feed an operational amplifier $A_2$ having a resistor $R_{12}$ in its negative feedback loop and supplying the input of integrator 60. $A_1$ and $A_2$ are operational amplifiers as used in analogue computers and have such high gain that, when providing a finite voltage output, the input voltage can be regarded as infinitely small. Such amplifiers are termed "virtual earth input amplifiers".

The embodiments of FIGS. 6 and 7 are particularly useful in applications where a resistance value varies with the quantity to be measured. In the case of the embodiment of FIG. 7, the voltage (Eo) applied to the input of the integrator (i.e. the amount of regenerative feedback) is proportional to the value of the thermometer resistance $R_t$ and proportional to the resistance $R_{12}$ and is given by the equation:

$$E_o = E_1\, K_1\, (R_t - K_2)$$

where $E_1$ = voltage output of the bistable bipolar device $K_1 = R_{12}/R_{11}\, R_9$ and $K_2 = R_{11}\, R_9/R_{10}$ The sensitivity or frequency span of the oscillator is adjusted by varying the value of $R_{12}$ and variations in temperature effects variations in the resistance ($R_t$) and thereby variations in the output frequency of the oscillator.

The coupling unit 62 (FIG. 8) is a variable capacitance coupling unit for use when the quantity to be measured effects a change in a capacitance value.

The output of the bistable-bipolar device is applied through the variable capacitance $C_1$to an operational charge amplifier $A_1$ having a capacitive ($C_2$) negative feedback loop. The output of the operational amplifier $A_1$ is then fed to another operational amplifier $A_2$ having a negative feedback loop including a variable resistance $R_1$ for adjusting the frequency span or sensitivity of the oscillator. Owing to the high impedance of the capacitive circuit, the operational amplifier $A_1$ is of the low input current type known in the art as a 'charge amplifier'. Zero setting is achieved by means of a variable resistance $R_2$ connected in parallel with the operational amplifier $A_1$ and capacitor $C_1$. In this case $E_2 = K\, E_1$ where $K = C_1/C_2$; $E_2$ is the voltage output of the operational amplifier $A_1$ and $E_1$ is the voltage output at the bistable bipolar device.

What we claim is:

1. An adjustable frequency oscillator comprising a negative feedback, operational amplifier functioning as an integrator whose output is connected to a bistable-bipolar threshold device, said threshold device comprising an operational amplifier connected as a Schmitt trigger and having a resistive negative feedback loop for providing a bistable-bipolar output and switching the bipolar output from one stable state to the other stable state each time the input voltage applied thereto exceeds a predetermined fraction of the bipolar output and has a polarity opposite to the bipolar output, a regenerative feedback connection between the output of the threshold device and an input of the integrator and an adjustable coupling unit for adjusting the amount of regenerative feedback including a differential transformer having a primary winding feed from the output of said thershold device and a secondary winding connected to the input to said integrator, and a further operational amplifier connected to the output of said device having a negative feedback loop including a resistance and a capacitance connected in parallel, said further operational amplifier connecting said primary winding, to the output of said operational amplifier functioning as a Schmitt trigger.

2. An oscillator according to claim 1 wherein the time constant of the said negative feedback loop is substantially equal to the time constant of the primary winding of the transformer.

3. An oscillator according to claim 2 wherein a damping resistor is connected across the secondary winding of the transformer.

4. An adjustable frequency oscillator comprising a negative feedback, operational amplifier functioning as an integrator whose output is connected to a bistable-bipolar threshold device, said threshold device comprising an operational amplifier connected as a Schmitt trigger and having a resistive negative feedback loop for providing a bistable-bipolar output and switching the bipolar output from one stable state to the other stable state each time the input voltage applied thereto exceeds a predetermined fraction of the bipolar output and has a polarity opposite to the bipolar output, an adjustable coupling unit, connected in a regenerative feedback loop between the output of the threshold device and an input of the integrator, for adjusting the amount of regenerative feedback and including a differential transformer for adjusting the amount of the regenerative feedback, the primary winding of which is fed from the threshold device and the secondary winding of which feeds the input of the integrator, said transformer having a primary winding feed from the output of said threshold device and a secondary winding feeding the input to said, integrator, the output of the said device being connected to the input of a further operational amplifier having a negative feedback loop including a resistance and a capacitance connected in parallel, said further operational amplifier connecting said primary winding to the output of said operational amplifier functioning as a Schmitt trigger.

5. An oscillator according to claim 4 wherein the time constant of the negative feedback loop is substantially equal to the time constant of the primary winding of the transformer.

6. An oscillator according to claim 4 wherein the transformer has a fixed coupling ratio, the primary winding of which is fed from the output of the threshold device and the secondary winding to which is connected to the input of a resistance bridge circuit which when balanced produces no regenerative feedback but when the balance is disturbed by a certain amount produces a corresponding amount of feedback, the output of the bridge circuit feeding the input of the integrator.

7. An oscillator according to claim 4 wherein a damping resistor is connected across the secondary winding of the transformer.

* * * * *